Feb. 11, 1964 K. L. WILCOX 3,120,885
BRAKE DEVICE FOR CONVEYOR
Filed Dec. 21, 1961

INVENTOR.
KENNETH L. WILCOX
BY
*Barlow & Barlow*
ATTORNEYS

United States Patent Office 3,120,885
Patented Feb. 11, 1964

3,120,885
BRAKE DEVICE FOR CONVEYOR
Kenneth L. Wilcox, 226 Vermont Ave., Providence, R.I.
Filed Dec. 21, 1961, Ser. No. 161,147
3 Claims. (Cl. 193—35)

This invention relates to a conveyor and more particularly to a conveyor of the type which is used to move packages by gravity from one point to another.

One of the objects of this invention is to provide a means for retarding gravity impelled moving packages as they approach the discharge end of a conveyor.

More specifically, an object of the invention is to provide a means for applying friction to the wheels of a conveyor along which packages travel by gravity so as to retard packages which move along the conveyor from one wheel to another.

Another object of the invention is to provide a device which may apply friction on a side face of the conveying wheels and yet remain below the package contacted surface of the conveying wheels.

Another object of the invention is to provide an arrangement so that pressure may be applied upon a plurality of wheels at one time or may be adjusted so that pressure may be greater upon some of the wheels than upon others.

With these and other objects in view, the invention consists of certain novel features of construction as will be more fully described and particularly pointed out in the appended claims.

Figure 1:
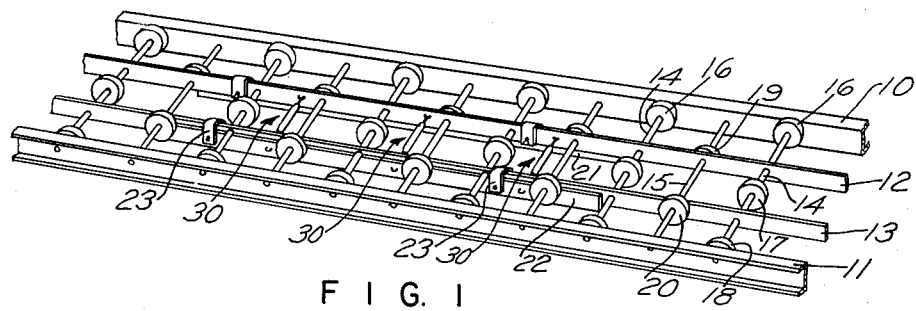
FIG. 1 is a perspective view of a conveyor with my invention applied thereto.

In proceeding with this invention, I have provided two elongated members in the form of bars which may extend lengthwise of the conveyor and be of a size to engage the side faces of the wheels of the conveyor, these bars being so connected that they may be forced against the side faces of the wheels of the conveyor so as to apply friction thereon.

With reference to the drawings, 10 and 11 designate the outer side bars of a conveyor which are of outwardly facing channel shape while intermediate bars 12 and 13 extend lengthwise between the outer side bars 10 and 11. Axles 14 and 15 alternate and extend laterally through the intermediate bars and through the side bars 10 and 11 and are fastened in the bars so as to hold the bars in spaced relation.

Upon each axle 14, three wheels 16, 17 and 18 are mounted for free rotation, suitable means being provided to maintain the wheels in substantially the position in which they are shown, such for instance as by the provision of protruberances in the axles to hold them in desired alignment laterally of the conveyor. A series of these axles 14 with their corresponding wheels thereon are shown so that each of the wheels 16 are in longitudinal alignment and as also are each of the wheels 17 and 18, as may be clearly seen in FIGURES 1 and 2. On axle 15 wheels 19 and 20 are positioned and are held by similar means in desired position laterally of the conveyor. These wheels 19 and wheels 20 are in staggered relation to the wheels 16, 17 and 18 on axle 14. Likewise, these wheels 19 and wheels 20 are in longitudinal alignment throughout the length of the conveyor as may be seen in FIGURES 1 and 2. Each of the wheels 16 to 20 extend above the bars which support their axles as may clearly be seen from FIG. 3 to support a package above the longitudinally extending bars so that when the conveyor is inclined such as from a truck to the sidewalk or into a cellar of a building, a package placed upon the conveyor under the action of gravity will roll by means of the wheels from the truck to the sidewalk or cellar where it is to be discharged. Up to this point the description of the conveyors are similar to what is in common use in the industry.

Figure 5:
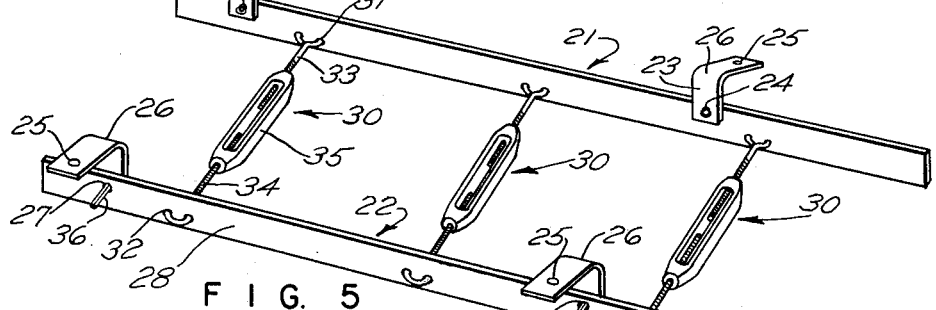
FIG. 5 is a perspective view of the brake device detached from the conveyor.

It sometimes occurs where there is a relatively steep inclination causing the packages to be traveling too fast at their delivery end and it is desired that the packages be retarded to prevent possible breakage or to assist handling. In order to accomplish this, I have provided a brake device which is shown by itself in FIG. 5 and which comprises a pair of members 21 and 22 which are of a width usually less than one half the diameter of the wheels 16 to 20 and which are of a length depending upon the number of wheels which are to be engaged and to which friction is to be applied. In the present instance the members are of a length to engage four wheels on the axles 15, although the number of wheels engaged may be varied by varying the length of the brake members 21 and 22.

Figure 2:
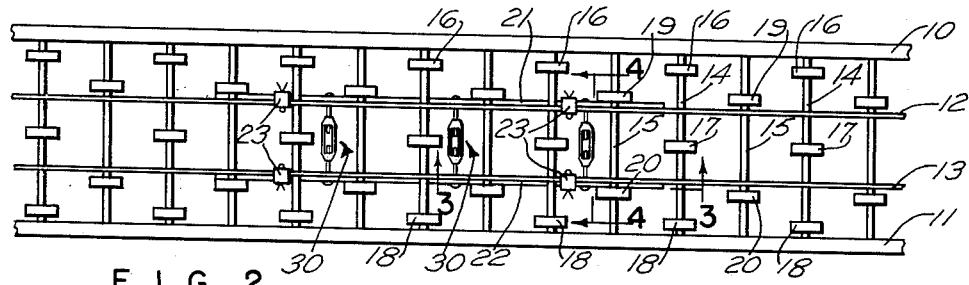
FIG. 2 is a top plan view of the same.
Figure 3:
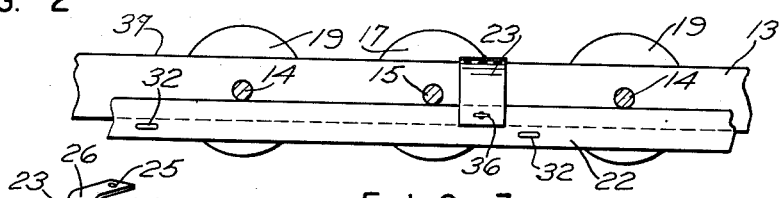
FIG. 3 is a sectional view on line 3—3 of FIG. 2 showing a fragmental detail of the invention and on a somewhat larger scale.
Figure 4:
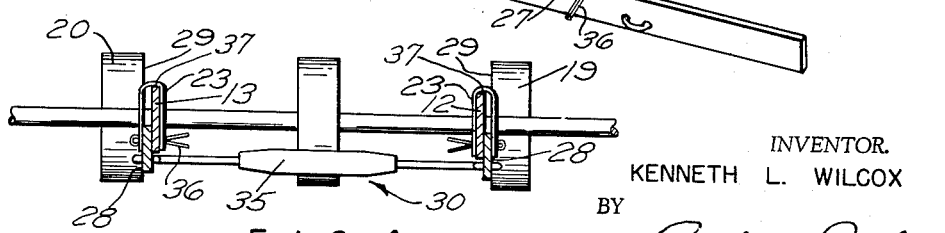
FIG. 4 is a sectional view on substantially line 4—4 of FIG. 2.

While these brake members may be positioned to engage either the outer surfaces of the wheels such as 19 and 20 or the inner surfaces thereof, I have chosen in this illustration to mount these brake members along the intermediate bars 12 and 13 and on the inner faces 29 of the wheels 19 and 20 as may be seen in FIGS. 1, 2 and 4. To support the brake members 21 and 22 from the intermediate bars 12 and 13, I have provided lightweight metal straps 23 which are provided with holes 24 and 25 adjacent their ends and which are bent as at 26 so as to extend over the upper edge 37 of the bars 12 and 13 and then by causing the holes 24 and 25 to register with holes 27 in the members 21 and 22 and passing a cotter pin 36 through these registering holes, I support the brake members from the intermediate bars 12 and 13 along the outer surfaces of the bars 12 and 13 and in a position so that the outer faces 28 of the members 21 and 22 are adjacent the faces 29 of the wheels 19 and 20. Thus by moving the members 21, 22 apart into contact with the faces of the wheels, friction will be applied upon the faces 29 by the surfaces 28 of the brake members. In order to force the brake members outwardly, I have provided turnbuckles 30 attached by an eye as at one end 31 to the member 21 and by an eye as at the other end 32 to the member 22. These eyes have shanks which are oppositely threaded as at 33 and 34 to provide left and right-hand threads so as to be moved apart by turning of the body portion 35 of the turnbuckle in one direction, whereas turning the body 35 in the opposite direction will cause the member to be moved toward each other. By having a plurality of turnbuckles 30, it will be apparent that the turnbuckles may be adjusted so that a light amount of friction can be applied upon the faces of wheels 19 and 20 first contacted by the conveyed package, whereas greater pressure may be applied on the next set of wheels and still greater pressure may be applied on the further advanced set of wheels so that the package will progressively encounter greater frictional resistance to the turning of the wheels as it proceeds along the conveyor. More than one braking device may be applied or the length of the braking device may be varied as occasion may require.

It will also be apparent that the members 21, 22 may be positioned to engage the outer faces of the wheels and then drawn toward each other to apply friction.

I claim:
1. In a conveyor, a plurality of spaced longitudinally extending bars, a plurality of disk type wheels mounted for rotation about fixed axes extending laterally of the bars, said wheels each having a work supporting circular surface and an exposed end face, a brake member supported by said bars having a surface adjacent the end face of at least one of said wheels and a turnbuckle to urge said member to cause its surface to engage the end face of said wheel to frictionally retard its rotation.

2. In a conveyor, a plurality of spaced longitudinally extending bars, a plurality of disk type wheels mounted for rotation about fixed axes extending laterally of the bars, said wheels each having a work supporting circular surface and an exposed end face, a brake member extending lengthwise of said bars and adjacent one of said bars, hangers supporting said brake member from the bar to which it is adjacent such that it may move laterally thereof, said brake member having a surface adjacent the end face of at least one of said wheels and a turnbuckle to urge said member to cause its surface to engage the end face of said wheel to frictionally retard its rotation.

3. In a conveyor, a plurality of spaced longitudinally extending bars, a plurality of longitudinal rows of disk type wheels mounted for rotation about longitudinally spaced fixed axes each extending laterally of the bars, said wheels each having a work supporting circular surface and an exposed end face, spaced brake members supported by said bars each having a surface adjacent the end face of a plurality of said wheels in one of said rows and a turnbuckle to urge said members in opposite directions to cause their surfaces to engage the end faces of a plurality of said wheels in two spaced rows to frictionally retard their rotation.

References Cited in the file of this patent
UNITED STATES PATENTS

| | | |
|---|---|---|
| 908,232 | Finley | Dec. 29, 1908 |
| 1,281,594 | Lehman | Oct. 15, 1918 |
| 1,355,337 | Hoffman | Oct. 12, 1920 |
| 1,483,971 | Grossman | Feb. 19, 1924 |
| 1,900,149 | Anderson | Mar. 7, 1933 |
| 2,388,283 | Porter | Nov. 6, 1945 |
| 2,494,302 | Mason | Jan. 10, 1950 |
| 2,563,965 | Seed | Aug. 14, 1951 |
| 2,704,143 | Cushman | Mar. 15, 1955 |
| 2,979,177 | Sullivan | Apr. 11, 1961 |